May 4, 1926.

J. S. O'HARA 1,583,361

AUTOMATIC REGULATOR

Filed Feb. 5, 1924

Inventor,
Joseph S. O'Hara.
By Church & Church
His Attorneys

Patented May 4, 1926

1,583,361

UNITED STATES PATENT OFFICE.

JOSEPH S. O'HARA, OF ROMNEY, WEST VIRGINIA.

AUTOMATIC REGULATOR.

Application filed February 5, 1924. Serial No. 690,829.

*To all whom it may concern:*

Be it known that I, JOSEPH S. O'HARA, a citizen of the United States, residing at Romney, in the county of Hampshire and State of West Virginia, have invented certain new and useful Improvements in Automatic Regulators; and I do hereby declare the following to be a full, clear, and exact description of the same, reference being had to the accompanying drawings, forming part of this specification.

This invention relates to mechanisms for the automatic regulation of power in any form by mechanism set in action by the closing of a high voltage circuit by means of the pointer or indicator of a measuring instrument. The present application may be considered an improvement over the system disclosed in my Patent 1,468,729 for automatic regulators, dated September 25, 1923.

The object of the present invention is to improve and simplify such mechanism for altering power for operating machinery so as to maintain a predetermined normal condition in the system in which the apparatus is installed, in such installations as electric power systems in which electric power is supplied which it is desired to maintain at a predetermined potential or current or frequency; in pumping systems in which a certain level or pressure of water or other liquid is to be maintained, or air pressure or vacuum; and in temperature regulating systems, etc.

A further object of the present invention is to reduce the number of transformers for regulating the conditions in the system in which the equipment is installed.

A still further object of the invention is to apply a regulator employing one transformer and high potential contact or electrode to such a system for maintaining the predetermined operating conditions or, in certain applications of the system to employ any number of such transformers or multiplicity of coils in and taps to the transformer or transformers and electrodes in which case the motive power may first be caused to function slowly and then more violently as the system requires more regulation.

Another object of the invention is to incorporate in one or more of the transformer circuits indicating mechanism such as plain or colored lamps, bells, buzzers, horns, etc., which may be located adjacent to the regulator or at any remote point when required.

In the drawings,—

Figure 1 is a diagram of an electrical power system to which a voltage regulator in accordance with this invention has been applied, and Figure 2 is a diagrammatic representation of a pumping system employing a regulator in accordance with this invention.

Referring to Fig. 1, an alternating current source 10 supplies energy to power mains 11 and 12 for consumption in translating devices 14 here shown as lamps. A voltmeter 15 is connected with the mains 11 and 12 by means of conductors 16 and 17 connected with the voltmeter binding posts 18 and 19 respectively. The voltmeter indicator 20 is of the usual type, but is provided with an electrode 21 of a material suitable to withstand severe sparking. A potential regulating transformer T is connected with its primary winding 22 across the source 10, and its secondary 23 has one connection with the source 10 and has taps connected with a series of contacts 24. A movable arm 25 is adapted to be swung over these contacts and connects one of them by means of conductors 26 and 27 with the power mains 11 and 12.

In accordance with this invention a high potential transformer H has its primary winding 28 connected with the power mains 11 and 12, one end by means of the conductors 29, 30 and 31, a suitable signal device 32 if desired, and a motor 33 in series therewith, the other end of said winding being connected to the power circuit by means of the conductors 34 and 27.

The high potential winding 35 of the transformer is connected with electrodes in the voltmeter 15; one end of the winding is connected with a conductor 36, which may be common to a plurality of transformer secondaries, this conductor leading to the electrode 21 on the voltmeter indicator; and the other end of this winding is connected by means of a conductor 37 with an electrode 38, the first of a series of fixed electrodes 38, 39, 40, etc., on one side of the normal indicating position of the voltmeter while the system is in operation.

A high potential transformer I having windings 41 and 42 is connected with the power mains 11 and 12 through motor 33, a signal device 43 if desired and conductors 44, 45, 46 and 47, and with electrodes 21 and 48 in a similar manner. It will be noted that the electrode marked 48 is the first of a series of adjustably fixed electrodes 48, 49, 50, etc., on the opposite side of the normal indicating position of the voltmeter.

Any number of such high potential transformers or coils of transformers may be connected, across the power mains 11 and 12, with the motor 33 and the electrodes in the voltmeter 15. To the right of transformer I are transformers J and K having connections with the motor 33 and the electrodes 21, 49 and 50. The primary circuits of these transformers may be provided with signal apparatus 51 and 52 respectively, as in the connections of transformers H and I. Transformers, not shown, are or may be likewise connected with the motor 33 and voltmeter electrodes 21, 39 and 40 and may similarly be provided with signal equipment.

The motor 33 is shown connected in the primary circuits of the high potential transformers by a plurality of separate pairs of binding posts 53—54, 55—56, 57—58, etc. These make various connections with the motor windings for altering the speed and changing the direction of rotation of the motor for driving the arm 25 in one direction or the other in order to bring the line potential to normal. The motor is shown with means for driving a belt or chain 59 which drives a pulley or sprocket wheel 60 mounted on the pivot shaft of the arm 25 for purposes of illustration but obviously other means for driving the arm 25 could be readily employed, or other means for bringing about the actual regulation could be used.

The operation of this form of the regulator is as follows: When the potential is normal the indicator 20 maintains a position such that the electrode 21 which it carries is between the fixed electrodes 38 and 48. Upon an increase or decrease in line potential the indicator will swing in one direction or the other so that the electrode 21 will approach one or the other of said electrodes and when the electrodes are within sparking distance of each other sufficient current is drawn from the mains 11 and 12 to operate the motor 33 and the signal device 32 thereby moving the arm to the next contact or further in the series of contacts 24 etc. of the transformer T and thus bringing the line potential to the desired normal potential when the motor will stop and likewise the signal device will be turned off.

In case of a greater increase in potential the indicator will pass far enough to the left for the electrode 21 to pass beyond electrode 48 and approach electrode 49 or 50, in which event, if the electrode is broad enough to cover several of the fixed electrodes at once then there will be an increase in the current in each of the transformers, thereby operating their signal devices and passing current through their connections with motor 33. Thus a greater amount of energy may be delivered to the motor, the motor will be operated more vigorously which is an advantage in some systems to which such regulating equipment may be installed though in the present showing an increase in power may not be essential, and various signal devices, one or more according to the number of electrodes covered by the movable electrode 21, may be operated In case the electrode 21 is broad enough to cover but one of the fixed electrodes at a time, only one transformer circuit will be affected for producing the regulation of the system. The normal potential of the system may be changed by changing the position of the fixed electrodes 38, 48, etc., which may be mounted in slots in the voltmeter dial as shown, so the regulation and operation of various signals may be set as desired.

In the application of the invention disclosed in Fig. 2, a source of alternating current is represented at 61 which supplies a motor 62 through mains 63 and 64 and conductors 65 and 66, which motor is adapted to operate a pump 67. In this pumping system the idea is to withdraw water from a pit P into which waste water flows and to keep the pit from overflowing by pumping the water out whenever the pit gets nearly full or at a predetermined point. This is accomplished by means of the regulator equipment comprising a high tension transformer R, float F and indicator mechanism S. The transformer R has its primary winding 68 in series with the motor 62, and its secondary winding 69 is connected with the indicator mechanism S, one end with a fixed electrode 70 and its other end with the pointer 71 which carries the movable electrode 72. The pointer 71 is provided with a sprocket wheel or pulley 73 over which a chain belt or cord 74 passes and is adapted to swing the pointer in accordance with the position of the float F with which the cord is connected at one end. A counterweight W may be fastened to the other end of the cord as shown, this being preferred to a spring return.

In the operation of this system the motor 62 is inoperative when the level of the water in the pit is low enough so that the movable electrode 72 is not in the vicinity of the fixed electrode, this being the normal condition. In this position the primary winding 68 of the transformer R has such a high impedance that the current in the circuit is insignificant and the motor will not operate, but when the float rises so that the electrodes are near enough each other so that sparking will take place between them there will be an increase of current in the primary winding so that the motor will run and operate the pump until the level of the water in the pit is lowered enough to separate the electrodes. It will readily be seen that in case it is necessary to operate the pump faster, a greater current would be delivered to the motor by introducing more than one transformer and providing a series of contacts such as 48, 49, 50, etc., as fully set forth in connection with Fig. 1.

Of course it is evident that in many cases it might be desirable to reverse this operation and have the pump connected to deliver water to the pit or tank instead of taking it out as in the case of a reservoir. The principle is the same, and an approximately predetermined level can be maintained by merely reversing the direction in which the cord, chain, or rope operates the pointer mechanism and by reversing the pump connections. It will also be understood that the regulator is applicable to other systems such as air pressure systems, or for controlling temperature, speed, etc.

The detailed description of the various portions of the apparatus mentioned in the specification is merely for clearness of illustration of the invention and such details may be departed from to considerable extent without departing from the spirit of the invention.

What I claim is:

1. In a system including electrically operated means for controlling the system; a plurality of circuits each connected with the controlling means, a meter, an indicator on said meter, a contact member carried by said indicator and connected with said circuits, and a series of contacts fixed with respect to said meter, each connected with one of said circuits and so positioned as to lie in proximity to the path of said contact member on said indicator and to be covered by said contact member, one after another, for closing said plurality of circuits in the order of the series for regulating the operation of said electrically operated controlling means the circuit or circuits initially closed remaining in that condition while the successive circuits are closed.

2. In a system including electrically operated means for controlling it, a plurality of circuits connected with said controlling means for regulating the operation thereof, a high tension transformer having primary windings connected in series respectively with said circuits, a meter having a series of fixed electrodes and a movable electrode carried upon its indicator adapted to cover the electrodes of the series in order, and each of the high tension secondary windings of said transformer having one end electrically connected with said movable electrode and the other ends each with one of the fixed electrodes said movable electrode being capable of maintaining two of said circuits closed at the same time.

JOSEPH S. O'HARA.